Patented Jan. 20, 1948

2,434,683

UNITED STATES PATENT OFFICE 2,434,683

SURFACE ACTIVE COMPOSITIONS

Marinus Buis, Whitby, and Dillwyn Morgan Samuel, Chester, England, assignors to Shell Development Company, San Francisco, Calif., a corporation of Delaware No Drawing. Application August 3, 1944, Serial No. 547,992. In Great Britain August 19, 1943

8 Claims. (Cl. 252—353)

This invention relates to surface active compositions.

It has been found that when solutions of the alkali metal salts of sulphuric acid esters of primary, secondary or tertiary alcohols having from 8 to 20 carbon atoms in the molecule are prepared, there is a tendency for gels to be formed, particularly at low temperatures.

It has been proposed to overcome this disadvantage by the addition of sulphamic acid derivatives such as ammonium sulphamate, and on examining this proposal we have found that the use of ammonium sulphamate is relatively satisfactory.

It is an object of the present invention to provide an addition which will overcome the aforesaid disadvantage, but which will be effective in lower concentrations, and will be cheaper and more readily accessible than ammonium sulphamate.

With this object in view the present invention provides surface active compositions comprising alkali metal salts of sulphuric acid esters of primary, secondary or tertiary alcohols having from 8 to 20 carbon atoms in the molecule (hereinafter referred to as "detergents"), water and a small proportion of one or more sulphates, chlorides, thiocyanates, nitrates, phosphates, citrates, carbonates or carbamates of ammonia or of a substituted ammonia such as triethanolamine or of magnesium.

It should be understood that the alkali metal salts of the sulphuric acid esters may contain other inorganic salts such as sodium sulphate or sodium chloride. Such salts are often present owing to the method of preparation of the alkali metal salts of the sulphuric acid esters but their presence is not essential.

Preferably the salt of ammonia or of a substituted ammonia or of magnesium is employed in a proportion of 0.05 to 0.5 gm.-mol of the anhydrous salt per litre of the composition, and the salts which we prefer to use are ammonium chloride, ammonium sulphate and diammonium hydrogen phosphate.

It will be understood that the sulphuric acid esters may be used singly but in general mixtures will be used, for example the sulphuric acid esters of mixtures of alcohols within the range of 8 to 20 carbon atoms in the molecule.

It is found that for each salt there is an optimum concentration; that is to say, for any particular detergent the addition of gradually increasing amounts of the salt results in more satisfactory prevention of gelation until a maximum is reached, whereafter the addition of further salt produces a less satisfactory result. This effect is shown by way of example with reference to a particular detergent containing 21% of sodium salts of sulphuric acid esters of secondary alcohols having from 10 to 18 carbon atoms in the molecule, prepared by the sulphation of a mixture of olefines containing from 10 to 18 carbon atoms in the molecule and 7.6% of inorganic salts, mostly sodium sulphate, the remainder being water, in the following Tables I and II, in which the aforesaid detergent is referred to as "ester salts solution." Table II also shows the advantage of the invention over the use of ammonium sulphamate.

TABLE I

*Effect of ammonium chloride on gelation of ester salts*

| Conc. of NH₄Cl in— | | Appearance of solution after 6 days' storage at 6 to 8° C. |
|---|---|---|
| Per cent anhydrous salt on ester salts solution | mols per litre | |
| Nil | Nil | Gelled completely. |
| 0.4 | 0.08 | Do. |
| 0.6 | 0.11 | Some gel present. |
| 0.9 | 0.17 | Perfectly clear. |
| 1.2 | 0.21 | Nearly clear. |
| 2.7 | 0.50 | Distinctly turbid. |
| 3.5 | 0.66 | Turbid and some curd present. |
| 4.5 | 0.84 | Very turbid. Large quantity of curd present. Froth remained stable for several days. |

TABLE II

*Optimum concentration of various ammonium salts*

| Salt | Conc. of anhydrous salt in g./l. of Ester Salts Solution | Conc. of anhydrous salt in mols/litre of Ester Salts Solution |
|---|---|---|
| NH₄-sulphamate | 40 | 0.35 |
| NH₄CNS | 22 | 0.28 |
| NH₄NO₃ | 17 | 0.21 |
| NH₄Cl | 9 | 0.17 |
| (NH₄)₂SO₄ | 10 | 0.13 |
| (NH₄)₂HPO₄ | 23 | 0.11 |

We claim:

1. A substantially non-gelling surface active composition comprising an aqueous solution of an alkali metal salt of a sulfuric acid ester of an alcohol having from 8 to 20 carbon atoms in the molecule, which solution tends to form gels, together with an amount between 1.27% and 12.7% by weight, based upon the amount of said sulfuric acid ester salt, of a water soluble salt selected from the group consisting of sulfates, chlorides, thiocyanates, nitrates, phosphates, carbonates and carbamates of ammonia, sufficient to substantially prevent gelation of said solution.

2. A substantially non-gelling surface active composition comprising an aqueous solution of an alkali metal salt of a sulfuric acid ester of a primary alcohol having from 8 to 20 carbon atoms in the molecule, which solution tends to form gels, together with an amount between 1.27% and 12.7% by weight, based upon the amount of said sulfuric acid ester salt, of a water soluble salt selected from the group consisting of sulfates, chlorides, thiocyanates, nitrates, phosphates, carbonates and carbamates of ammonia, sufficient to substantially prevent gelation of said solution.

3. A substantially non-gelling surface active composition comprising a concentrated aqueous solution of an alkali metal salt of a sulfuric acid ester of a secondary alcohol having from 8 to 20 carbon atoms in the molecule, which solution tends to form gels, together with an amount between 0.05 and 0.5 gm.-mol (calculated as anhydrous salt) per liter of solution, of a water soluble salt selected from the group consisting of sulfates, chlorides, thiocyanates, nitrates, phosphates, carbonates and carbamates of ammonia, sufficient to substantially prevent gelation of said solution.

4. A substantially non-gelling surface active composition comprising a concentrated aqueous solution of an alkali metal salt of a sulfuric acid ester of an alcohol having from 8 to 20 carbon atoms in the molecule, which solution tends to form gels, together with an amount between 0.05 and 0.5 gm.-mol (calculated as anhydrous salt) per liter of solution, of a water soluble salt selected from the group consisting of sulfates, chlorides, thiocyanates, nitrates, phosphates, carbonates and carbamates of ammonia, sufficient to substantially prevent gelation of said solution.

5. A substantially non-gelling surface active composition comprising an aqueous solution of an alkali metal salt of a sulfuric acid ester of an alcohol having from 8 to 20 carbon atoms in the molecule, which solution tends to form gels, together with an amount between 2.86% and 5.7%, by weight based upon the amount of said sulfuric acid ester salt, of ammonium chloride, sufficient to prevent gelation of the composition.

6. A substantially non-gelling surface active composition comprising an aqueous solution of an alkali metal salt of a sulfuric acid ester of an alcohol having from 8 to 20 carbon atoms in the molecule of about 21% concentration, which solution tends to form gels, together with about 9 grams per liter of said solution of ammonium chloride to substantially prevent gelation of the composition.

7. A substantially non-gelling surface active composition comprising an aqueous solution of an alkali metal salt of a sulfuric acid ester of an alcohol having from 8 to 20 carbon atoms in the molecule of about 21% concentration, which solution tends to form gels, together with about 10 grams per liter of said solution of amonium sulfate to substantially prevent gelation of the composition.

8. A substantially non-gelling surface active composition comprising an aqueous solution of an alkali metal salt of a sulfuric acid ester of an alcohol having from 8 to 20 carbon atoms in the molecule, which solution tends to form gels, together with an amount between 1.27% and 12.7%, by weight based upon the amount of said sulfuric acid ester salt, of ammonium sulfate, sufficient to prevent gelation of the composition.

MARINUS BUIS.
DILLWYN MORGAN SAMUEL.

REFERENCES CITED

The following references are of record in the file of this patent:

UNITED STATES PATENTS

| Number | Name | Date |
| --- | --- | --- |
| 2,061,619 | Downing et al. | Nov. 24, 1936 |
| 2,082,576 | Henke et al. | June 1, 1937 |
| 2,091,123 | McLean et al. | Aug. 24, 1937 |
| 2,111,911 | Fulton et al. | Mar. 22, 1938 |

FOREIGN PATENTS

| Number | Country | Date |
| --- | --- | --- |
| 352,989 | Great Britain | July 9, 1931 |
| 423,238 | Great Britain | Jan. 29, 1935 |
| 496,209 | Great Britain | Nov. 23, 1938 |